Nov. 27, 1951
O. S. FIELD ET AL
2,576,452
AIRPLANE APPROACH CONTROL SYSTEM
Original Filed May 7, 1945
2 SHEETS—SHEET 1
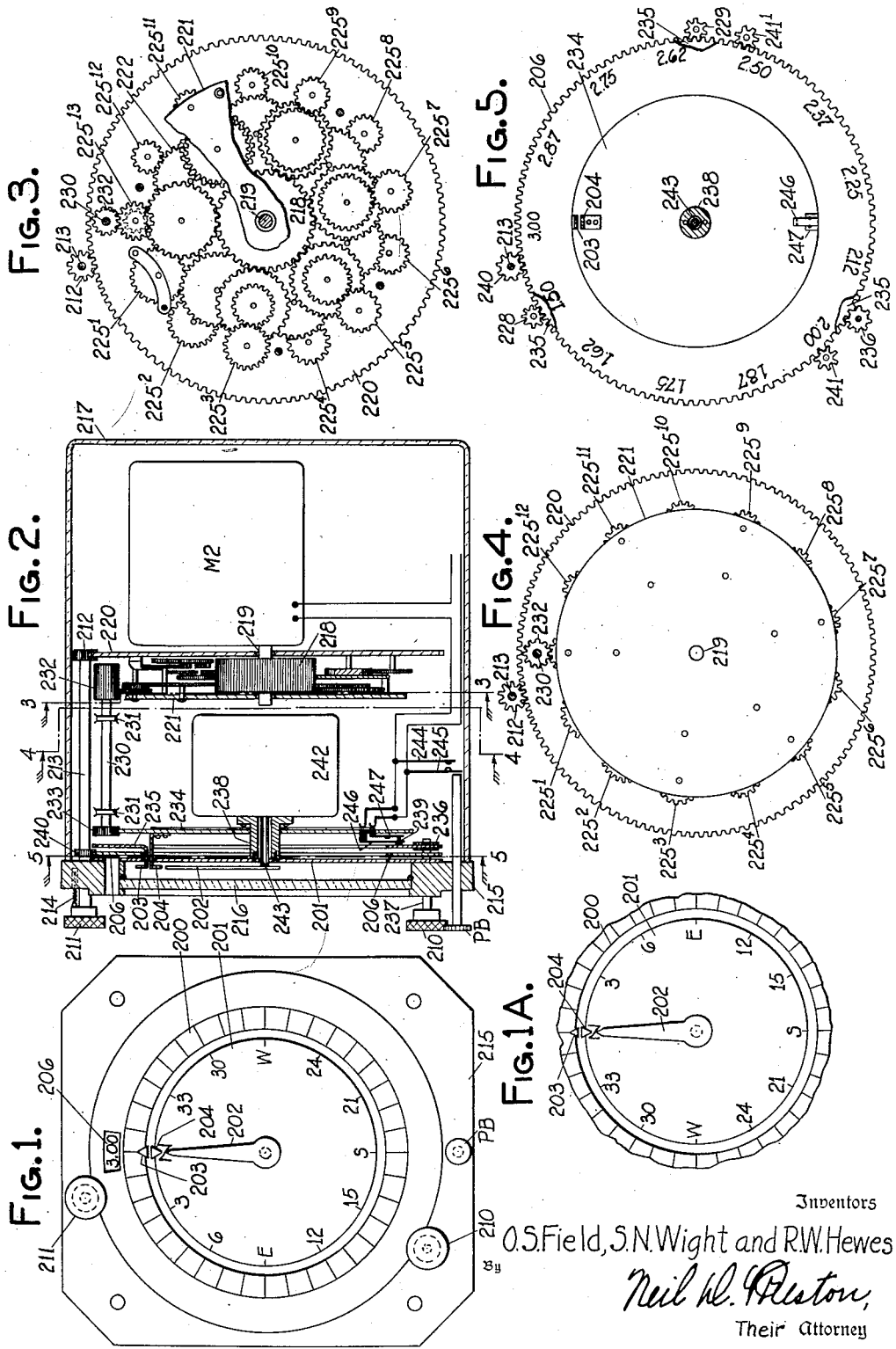
Inventors
O.S.Field, S.N.Wight and R.W.Hewes
Neil W. Preston,
Their Attorney Nov. 27, 1951  O. S. FIELD ET AL  2,576,452
AIRPLANE APPROACH CONTROL SYSTEM
Original Filed May 7, 1945  2 SHEETS—SHEET 2

Inventors
O. S. Field, S. N. Wight and R. W. Hewes
By Neil W. Preston,
Their Attorney Patented Nov. 27, 1951

2,576,452

UNITED STATES PATENT OFFICE 2,576,452

AIRPLANE APPROACH CONTROL SYSTEM

Oscar S. Field, Sedgwick N. Wight, and Ralph W. Hewes, Rochester, N. Y., assignors to General Railway Signal Company, Rochester, N. Y.

Original application May 7, 1945, Serial No. 592,416. Divided and this application June 10, 1949, Serial No. 98,212

5 Claims. (Cl. 177—311)

This invention relates to computers or flight predictors which compute or predict approximately the time an airplane must consume in flying in a variable length storage or holding loop in order to get into position to land at a predetermined time; and more particularly to such computing apparatus as may be carried by an airplane.

This application is a division of our prior application, Ser. No. 592,416, filed May 7, 1945, now Patent No. 2,495,140; and no claim is intended to be made herein to subject matter claimed in such parent application.

Also, the present invention is to be considered in the nature of an improvement over the system disclosed in the prior application of S. P. Saint, Ser. No. 569,335, filed December 22, 1944, now Patent No. 2,495,139; and no claim is to be made herein to subject matter disclosed in such prior application.

It has been the practice to store airplanes in one or more storage stacks near an airport, each airplane being assigned to fly in its particular assigned altitude, and to then cause these airplanes to be landed one at a time either directly from the altitude it first occupied or after it has been laddered down to one of the lower altitudes. By reason of the fact that the operator or dispatcher who instructs the initiation of a landing maneuver of an airplane from a storage stack does not know, at least under poor visibility, in what part of the flight path in his altitude in the stack the airplane is flying at the time the pilot is called to start a landing, it was necessary in earlier landing methods for the dispatcher to allow sufficient time between successive calling of airplanes from the holding stack to guard against any possible collision between two airplanes. It is this unnecessary long-time spacing between airplanes that is to be avoided by the use of the computer and associated apparatus embodying the present invention.

In accordance with the present invention, it is proposed to provide a computer which computes and defines automatically in accordance with the manual manipulation of push buttons on each airplane as to what form of flying pattern the pilot shall fly, the push buttons of which are preferably operated by the pilot of such airplane. In the prior applications above mentioned, a similar computer, when employed, was located in an office or tower on the ground and was manipulated by the operator at such office and not by the pilot of the airplane under consideration.

In accordance with the system of the present invention, part of the computing apparatus may be located on the airplane and part of such apparatus may be located in a ground control office. However, the system in a slightly modified form, may have the computing apparatus located wholly on the airplane.

The system of approach control for land procedures as proposed by this invention, provides a holding stack which is circular in form and is oriented with respect to a single ground located beacon. The airplanes in such holding stack at different levels may be successively and at equally timed spaced intervals instructed to commence a landing procedure employing the computer and apparatus of the present invention in such a way as to follow a circular holding loop after being called so as to consume the proper time to effect the successive landings at equally timed spaced intervals in spite of their random spacings in the holding stack. The computing apparatus provided in this system of the present invention advises the pilot how to steer his airplane to fly a holding loop of circular form having such a circumference as to consume the proper amount of time to effect the proper spacing between his airplane and the next preceding landing airplane.

The system of the present invention not only lends itself to the landing of airplanes on a ground located landing strip, but also to the landing of airplanes on an ocean-going airplane carrier.

Other objects, purposes, and characteristic features of the present invention will in part be understood from the following description, and will in part be obvious from the accompanying drawings, in which:

Figs. 1 through 6 illustrate a computer organization which may be located entirely on the airplane, or may be located partly on such airplane and partly in a ground located office, if desired, since the stop watch illustrated in Fig. 6 may be located either on the airplane or on the ground;

Fig. 1A illustrates a modified form of the dial shown in Fig. 1, which modified dial may be employed when procedure turns are to be performed clockwise instead of counter-clockwise;

Figure 7:
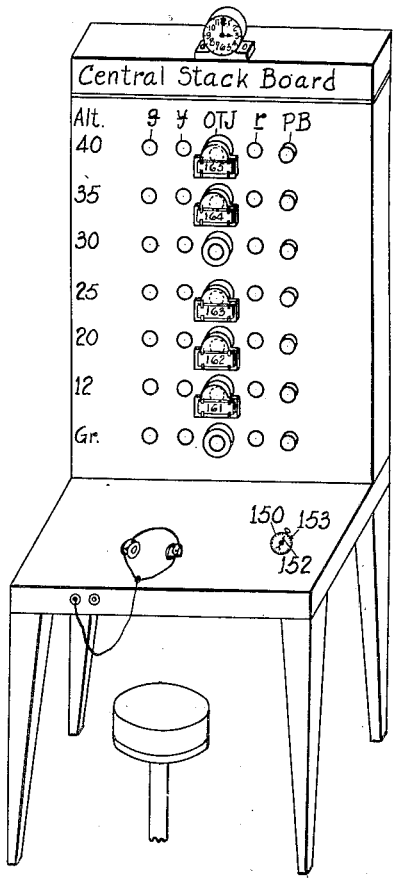
Figure 8:
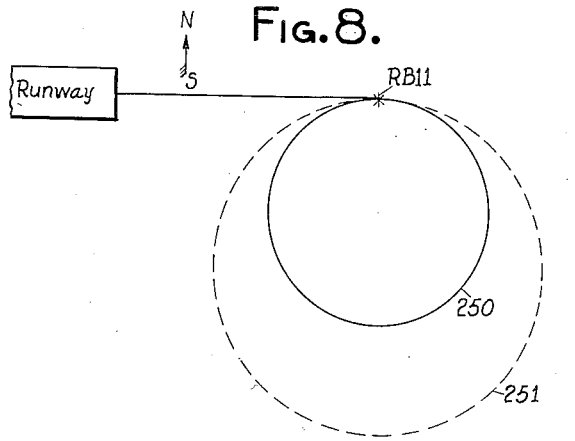
Figure 9:
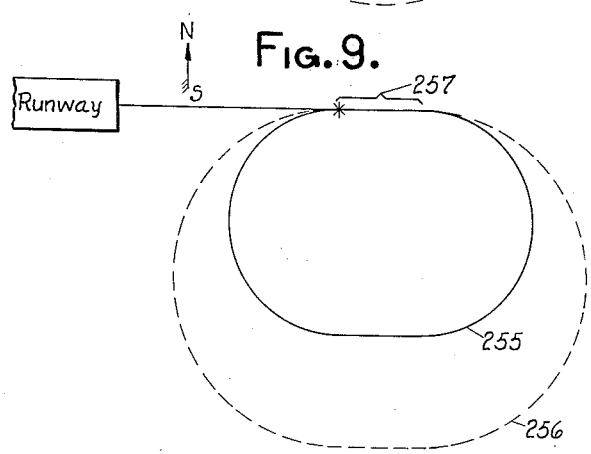
Figure 10:
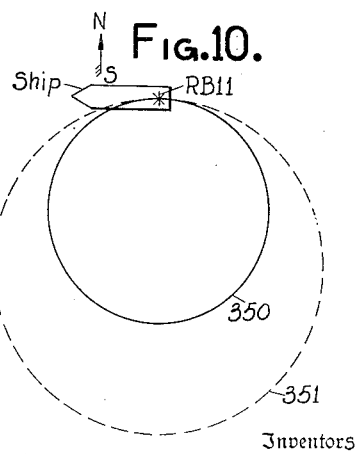

Fig. 7 illustrates a control board provided with indicating lamps, push buttons, and token jacks, similar to the control board employed in our prior application, Ser. No. 573,876, filed January 22, 1945, now Patent No. 2,522,029, and described in detail in the above mentioned parent application, Ser. No. 592,416, filed May 7, 1945;

Figs. 8 and 9 illustrate the flying patterns under no-wind and head-wind conditions respectively used in connection with the computer apparatus disclosed in Figs. 1, 2, 3, 4 and 5; and Fig. 10 illustrates the application of the computer of Figs. 1 to 5 to the landing of airplanes on an airplane carrier.

*Computer structure (Figs. 1 to 5).*—In Figs. 1 to 5 has been illustrated a modified computer which for convenience may be called a "turnometer" and which is used in connection with a circular holding stack of a fixed circumference expressed in time and of which, in the particular construction shown although other arrangements may be used, the holding loop comprises a circular loop having a circumference at least as large as that of the holding stack and under certain extreme conditions, namely, when the stack-loss time is zero has twice that circumference.

The face or dial side of this computer has been illustrated in Fig. 1. The dial is provided with a fixed direction or compass rose 200—201 with the east and west markings E and W and the azimuth numbers in reverse rotation thereon, having a gyrocompass repeating needle 202, a direction-of-wind index or pointer 203 which is readable on the rose 200—201, a time lapse operated index or pointer 204 operated by suitable time indicating means and a rate-of-turn indicator dial 206 which indicates the speed of rotation of the time indicator 204 in degrees per second. The reason for having the direction letters E and W and the azimuth numbers in reverse order on the rose 200—201 is to get the compass needle to point at the direction of wind pointer 203 when the airplane is headed into the wind, and to have the compass needle indicate the actual direction in which the airplane is heading. The face of this computer is also provided with a push button PB, a turn-knob 210 for rotating the wind direction ring 235 containing the index or pointer 203, and a turn-knob 211 for rotating the rate-of-turn indicating dial 206 and in so doing rotating a gear frame 220—221 coupling the pointer 204 to a suitable timing device including any one of various gear trains having different gear ratios and all driven by a common bull gear 218.

Refer now to Fig. 2 of the drawings, which shows a side view of the computer, partly in cross section, of which the front part of the casing comprises a front plate 215 including a cover glass 216 and the housing part of which includes the casing 217. In the rear end of this casing 217 is mounted a suitable timing motor M2 which through reduction gearing (not shown) contained within its housing drives bull gear 218 through the medium of a shaft 219. This shaft 219 pivotally supports the rotatable gear frame or gear works comprising a back gear plate 220 and a front circular plate 221 (partly broken away in Fig. 3) both of which are pivotally mounted on the shaft 219. This gear works 220—221 includes any desired number of separate gear trains radiating out from the bull gear 218, thirteen having been shown, terminating in individual drive pinions $225^1$ to $225^{13}$, inclusive. Each of these pinions $225^1$—$225^{13}$ is directly gear connected to the bull gear 218 and all of these pinions $225^1$—$225^{13}$ operate at different speeds. As an example, although other gear speeds may be used, we may assume that pinion $225^{12}$ is directly connected to the bull gear 218 through the medium of idler 222, whereas the tooth speed of pinion $225^{13}$ is higher and the tooth speeds of all other pinions $225^1$—$225^{11}$, inclusive, are lower than that of pinion $225^{12}$. For instance, if desired, these various tooth speeds may be such that pinions $225^1$, $225^2$, $225^3$, $225^4$, $225^5$, $225^6$, $225^7$, $225^8$, $225^9$, $225^{10}$, $225^{11}$, $225^{12}$ and $225^{13}$ drive gear 234 and pointer 204 at speeds of 0.25, 0.27, 0.291, 0.312, 0.333, 0.354, 0.375, 0.396, 0.417, 0.438, 0.459, 0.479 and 0.5 R. P. M. respectively, resulting in rate-of-turn in degrees per second of 1.5, 1.625, 1.75, 1.875, 2.00, 2.125, 2.25, 2.375, 2.5, 2.625, 2.75, 2.875 and 3 degrees per second, respectively, resulting in minutes per revolution of pointer 204 of approximately 4, 3.69, 3.43, 3.2, 3, 2.82, 2.66, 2.5, 2.4, 2.28, 2.18, 2.08 and 2, respectively.

In the top of the housing 217 is pivotally supported a shaft 230 supported, as for instance, by bearings 231 and containing pinions 232 and 233. The pinion 232 is so located that it may be engaged by any one of the pinions $225^1$ to $225^{13}$, inclusive, one at a time, whereas the pinion 233 at all times engages the gear 234 which supports the pointer 204. In other words, the pointer 204 may be driven clockwise by the bull gear 218 through the medium of any one of 13 different gear ratio gear trains, in the specific embodiment of the invention shown, depending upon the position assumed by the gear frame including back plate 220 which also constitutes a gear, which gear 220 is in continuous mesh with the pinion 212 directly connected to rotary knob 211 through the medium of shaft 213. The pitch diameter ratio between this pinion 212 and the back plate gear 220 is preferably 1 to 13 so that one complete revolution of the knob 211 will cause the back plate gear 220 to be rotated $\frac{1}{13}$ of a revolution and this knob 211 is preferably provided with a suitable detent including a notch into which notch in the knob 211 the spring 214 may enter, so that this knob 211 may be locked in any one of 13 different positions of the back plate gear 220. The wind direction pointer 203 is directly secured to a ring gear 235, which ring gear is pivoted by idlers 228 and 229 and may be turned to any one of various positions through the medium of the pinion 236 connected to the rotary knob 210 through the medium of a shaft 237. In other words, rotation of the rotary knob 210 causes rotation of the ring gear 235 and the pointer 203. Not only does rotation of the knob 211 rotate the gear works 220—221 but it also, as by pinion 240, rotates the ring dial 206, pivoted by idlers 241 and $241^1$, on which the rate-of-turn in degrees per second is visible through an opening in the front plate 215 of the computer. The dial 201 and gear 234 are supported by hub 238 of the motor 242.

The repeater compass needle 202 is preferably operated by a gyrocompass repeater motor 242, as through the medium of a shaft 243, so that this pointer 202 points to N on the compass rose when the airplane points due north and rotates to the right when the airplane turns toward the left (in modification below the direction of rotation is reversed). As a result of this construction orientation of the airplane with respect to due north causes the direction of nosing of the airplane to be indicated by reading the pointer 202 on the compass rose 200—201. This repeater motor 242, which is preferably a motor unit of a Selsyn motor combination, is of course controlled by a suitable gyroscopic or other form of compass. If desired, the direction of rotation of bull gear 218 and the direction of rotation of compass repeating motor 242 may be reversed, in which event the azimuth degrees and the E and W markings will be in the opposite direction about the rose 200—201 from that shown, namely, will be placed thereon as on an ordinary compass. In this case too the compass needle will point in the direction on the dial in which the airplane is heading. Such a modified compass rose has been shown in Fig. 1A.

The synchronous motor M2, or other electric motor having good time keeping qualities, is preferably controlled through the medium of two sets of contacts, namely, through the medium of push button contacts 244 and 245 controlled by the push button PB and through the medium of contacts 246 and 247 which are closed at all times except when pointers 203 and 204 are in registration. The contacts 246—247 may for instance be supported by gear 234, suitable slip ring connections being provided, and an insulating block 239 may be supported by ring gear 235 so that these contacts are open, as shown, when insulation 239 and contact 247 get into registration, namely when pointers 203 and 204 are in agreement. In other words, if the push button PB is depressed to start the motor M2 to thereby cause rotation of the pointer 204 to bring it out of registration with pointer 203 a stick circuit for the motor M2 is closed which remains closed until the pointer 204 has made a complete revolution and has again been brought into correspondence with pointer 203 and when this occurs the contacts 246—247 open to stop the motor M2. The motor M2 can only be restarted by either manually rotating of the pointer 203, as through the medium of knob 210, or by momentarily depressing the push button PB.

Figure 6:
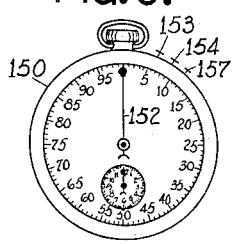

In Fig. 6 has been shown a stopwatch contemplated being used on the airplane as part of the computer or turnometer shown in Fig. 2. This stopwatch is similar to the one shown in Fig. 7 but is provided with separate start, stop and reset buttons 153, 154 and 157 respectively instead of the single button performing all three functions used in the stopwatch shown in Fig. 7.

To get a better understanding of the computer illustrated in Figs. 1 and 2 attention is directed to the sectional elevations thereof illustrated in Figs. 3, 4, and 5.

*Operation of computer (Figs. 1 to 5).*—As illustrated in Figs. 8, 9 and 10, the circular flying pattern contemplated as being used with the computer illustrated in Figs. 1 to 5 employs only a single radio beacon. This lends this system particularly to the landing of airplanes on airplane carriers, as more fully pointed out hereinafter and as illustrated in Fig. 10.

In Fig. 8 has been illustrated the physical shape of the flying pattern, under no-wind conditions, of which the inner circle 250 constitutes the holding stack and the outer circle 251 constitutes one of the many possible holding loops. In accordance with the present invention when practiced on land, or with the radio beacon RB11 mounted on an airplane carrier as illustrated in Fig. 10, it is contemplated to be so practiced that only head winds and no wind at all will be encountered. As shown in Fig. 9 head winds merely draw out the circles 250 and 251 of Fig. 8 into ovals or oblong paths 255 and 256 respectively as illustrated in Fig. 9 and the net result is that the total time of the flying pattern is increased in that the straight line run just before reaching the radio beacon is increased as the head wind increases. The time spacing of airplane landings is, however, not increased although the total time of a landing maneuver is increased. In Fig. 10 the two circles have been designated by reference numerals 350 and 351.

Let us assume that under no-wind condition and with the runway toward the west, as shown in Fig. 8, an airplane is being stored in the holding stack 250. The operator or dispatcher who is provided with a control board such as illustrated in Fig. 7 informs the various pilots as to the heading of the runway, namely, due west. The pilots will each in response to this information turn the knob 210 of his turnometer until index 203 points to the W on the compass rose. The pilot will then attempt to fly over radio beacon RB11 in a westwardly direction with his rate-of-turn dial 206 indicating 3.00 and with the pinion 225¹³ engaging pinion 232, as illustrated in Fig. 3. Each pilot will so steer his airplane that the compass needle 202 will line up with the index 204 which is rotated at a speed of 0.5 R. P. M. (clockwise in Fig. 1 and counter-clockwise in Fig. 1A) and each pilot will also depress push button PB each time he passes over radio beacon RB11 and this occurs simultaneously with the movement of pointers 202 and 204 by index 203. When he first turned index 203 to the W position on the compass rose and as he continued his flight the index 204 stopped when it reached the W (west) position because contacts 246—247 opened and stopped the synchronous motor M2. This would of course happen just as the airplane pointed at the runway. If it did not he could, and would, make a slight correction in the position assumed by index 203. His depression of push button PB at the completion of each turn would cause the motor M2 to restart just as he passed over the radio beacon RB11 and since he was then flying westwardly and his compass needle 202 was pointing to the north it also pointed directly to W on dial 200—201 and also to the index 203. If the pilot now keeps the compass needle 202 on the index 204 he will fly a circle having a curvature of 3 degrees per second, namely, a circular path having a two minute circumference. This is true because with dial 206 adjusted to indicate 3.00 per second the gear train, including gear 225¹³, will rotate pointer 204 at exactly 0.5 R. P. M. Each pilot continues to store his airplane at the proper altitude assigned to him and each time an airplane passes over radio beacon RB11 the pilot thereof will depress his push button PB.

Let us now assume that the operator calls the pilot of a particular airplane for a landing maneuver as the airplane he is flying is in the holding stack 250 and just as it is exactly diametrically opposite the radio beacon RB11 in this stack 250. The pilot continues his flight by keeping pointer 204 and compass needle 202 together, whereas the operator starts a suitable timing device such as the stop watch 150 shown in Fig. 7. As the airplane points directly at the runway and passes over radio beacon RB11 the pilot reports this event to the operator who immediately informs the pilot which rate-of-turn indication he shall display by his dial 206. In this case, the operator will tell the pilot to set his knob 211 until dial 206 indicates 2.00, meaning 2° per second, which the pilot will do and in so doing will select the gear train including pinion 225⁵. With gear 234 coupled to bull gear 218 through the medium of gear 225⁵ the index 204 will rotate at a speed of one revolution in three minutes so that as the pilot keeps compass needle 202 with index 204 he will consume exactly 3 minutes in completing his circular turn in holding loop 251. The total time consumed between the calling of the airplane for a landing maneuver and its second heading toward radio beacon RB11 is therefore 4 minutes. Under no-wind condition the airplane will be directly over the radio beacon when his circular turn has been completed. Had there been a head wind the pilot would have continued to head toward radio beacon RB11 by flying a straight line path such as shown at 257 in Fig. 9 during which time both the indicator 204 and compass needle 202 would have remained at rest. The compass needle would have remained at rest because the airplane was flying in a straight line (due west) and the index 204 would have remained stationary because the circle time would have run out, stopping motor M2 by opening of contacts 246—247, and the pilot would not yet have depressed push button PB because he would not yet have reached the radio beacon RB11.

The timing device mentioned as having been used by the operator to determine the rate-of-turn indication on dial 206, and the gear ratio to be selected, may be any suitable stack-loss measuring instrument which is calibrated to indicate rate-of-turn instead of stack-loss time. In fact, if desired, the pilot may himself use a stop watch, such as shown in Fig. 6, of which he starts the timing hand 152 by depressing button 153 when he is called by an operator for a landing maneuver. The pilot stops the timing hand as by depressing stop button 154 when the indexes 203 and 204 get into registration. The timing hand 152 may then be returned to its zero position by depression of the reset button 157 so as to return the stop watch to its normal condition for later use. This stop watch instead of being calibrated in time (stack-loss) may be calibrated in rate-of-turn to be consumed in the holding loop and the pilot may then set knob 211 in accordance with the rate-of-turn indicated by the stop watch upon completion of the holding stack circle. In this way, a certain amount of radio communication may be avoided to in turn allow more radio communication time for the laddering of airplanes from altitude to altitude in the holding stack.

Had the airplane just barely passed the radio beacon RB11 when it was called for a landing maneuver, instead of being located diagonally opposite as above assumed, the stack-loss time would have been two minutes instead of one and in this case the holding time would also have been two minutes instead of three, so that in this case the dial 206 would not have been changed from its 3° per second position and the holding loop would have had the same circumference (2 minute flying time) as the holding stack. Had the pilot been called just before, say 0.31 minute before he passed the radio beacon the stack-loss time would have been 0.31 minute and in this event the holding loop time would have been 3.69 minutes in which event the stop watch would have advised the pilot that he must turn dial 206 to indicate rate-of-turn 1.625 per second and in this case the gear train included pinion $225^2$ would have been brought into play.

Let us elaborate a little further. Let us assume that the pilot has a stop watch that is calibrated with two sets of numbers (1) in minutes starting with 4 and ending with 2 and (2) in degrees per second starting with 1.5° per second and ending with 3° per second (see relationships between these values above). If now the operator calls the pilot for a landing maneuver he will depress button 153 and start the time hand of his stop watch and when he completes his turn he will depress button 154 and stop the time hand. His stop watch will now no longer indicate stack-loss time but will instead indicate 4 minus holding loop time and will also indicate the degrees per minute rate-of-turn to consume this holding loop time. The pilot may then turn knob 211 until it indicates the 1.5 degree-per-second rate-of-turn time indicated on his stop watch.

If desired, the dial 206 may be calibrated in holding-loop time in which case the degrees-per-minute scale may be entirely omitted from the stop watch. Also, if desired the dial 206 may be calibrated in stack-loss time in which event an ordinary stop watch may be used. In this case, the minute markings on the stop watch dial start with zero it being assumed that the stop watch time hand rotates, say, one revolution in five minutes. In this case the pilot will measure the stack-loss time and set the knob 211 to indicate this stack-loss time. This will select the proper gear ratio to cause the pilot to fly a holding circle, by keeping pointers 202 and 204 together, of a circumference that will consume the time that is left after the stack-loss time has been subtracted from 4 for the specific construction assumed.

From the foregoing it is readily understood that the turnometer (Figs. 1 to 5) is particularly applicable to airplanes which are to land on an airplane carrier. It is well known that airplane carriers are always headed into the wind during landing operations for two reasons: first the airplane carrier is headed into the wind in order to reduce the minimum landing speed; and secondly, an airplane carrier is kept moving when an airplane is to land thereon in order to lengthen, so to speak, the runway afforded by such carrier. More specifically, every foot that the carrier moves forward with a landing airplane having its wheels in contact therewith increases the effective length of the runway to that extent. In other words, airplane carriers are always moving into the wind when an airplane is to land thereon. For this reason the landing scheme described in connection with Figs. 1 to 5 is particularly adaptable to airplane carriers and the landing procedure is exactly the same as the heretofore described procedure the only difference being that the extent of the head wind is the sum of the wind itself added to the speed of the airplane carrier. For these various reasons, it is believed unnecessary to specifically describe how an airplane may be landed on an airplane carrier by the employment of the turnometer described in connection with either a timer in the hands of the operator or a stop watch in the hands of the pilot as above described. It is of course understood that airplanes are called in succession at time spaced intervals equal to that of the intervals at which it is desired to land airplanes on either a runway or on an airplane carrier, as above described, the time spacing being considerably less than the maneuver time so that airplanes are landed in overlapped relationship.

Having thus shown and described one particular embodiment of the present invention, it is desired to be understood that the specific computers shown and described, and certain modifications thereof, which have been described only, have been selected for the purpose of facilitating the description of the underlying principles of the invention rather than its scope, or the specific construction preferably employed in practicing the invention, and it should be understood that various other designs and constructions as well as additions or modifications may be made, where required, to meet the situations encountered in practicing the invention, all without departing from the spirit or scope of the invention except as demanded by the following claims.

What we claim as new is:

1. In an airplane steering aid, a compass needle mounted in an airplane, means acting to maintain said needle pointing in the same direction regardless of the turning movement of the airplane, a pointer movable about the same axis as said compass needle, an electric motor operatively connected to said pointer and effective to rotate it about said axis at a preselected constant rate, whereby the turning movement of the airplane at that particular rate for a given direction which will cause said compass to rotate in the same direction and at the same rate as said pointer results in said airplane following a prescribed circular path in the body of air in which it is flying.

2. In an airplane steering aid, a compass pointer movable about an axis and mounted on an airplane, means acting on said compass pointer causing it to always point in a particular direction regardless of the turning movement of the airplane, a compass rose associated with said compass pointer and fixed with respect to the airplane so that the position of said compass pointer with respect to said compass rose indicates the heading of the airplane, a time pointer operable about the same axis as said compass pointer, an electric timing motor operable at a constant rate, and mechanical means connecting said motor with said timing pointer and including different gears manually shiftable to give different connecting gear ratios, whereby the turning movement of the airplane for a given direction to that degree required to cause said compass pointer to rotate in coincidence with said time pointer results in causing the airplane to travel in a prescribed path selected dependent upon the particular gear ratio then selected to connect said motor with said timing pointer.

3. In an airplane steering aid, a compass needle movable about an axis and mounted on an airplane, means acting on said compass needle causing it to always point in a particular direction, a compass rose associated with said compass needle, a first pointer movable about the same axis as said compass needle, an electric motor operatively connected to drive said first pointer about said axis at a preselected rate when supplied with energy, a second pointer always movable about said axis and manually operable to different positions on the compass rose, circuit means including contacts operated by said electric motor for supplying energy to said motor at all times except when said first pointer and said second pointer are in corresponding positions, and manually operable normally open contacts in multiple with said motor operated contacts for initiating operation of said motor to effect an operation of said first pointer out of correspondence with said second pointer, whereby the movement of the airplane at proper turning rate for a given direction will cause said compass needle to rotate in the same direction and at the same rate as said first pointer with such turning movement of the airplane resulting in a completion of a prescribed circular path with its point of initiation being indicated by said second pointer when such coincidence of movement of said compass needle and said first pointer is initiated at the position indicated by said second pointer.

4. In an airplane steering aid, a compass needle and dial on an airplane, said dial being fixed with respect to said airplane, means effectively operating said needle to point in a given direction regardless of airplane movement to thereby indicate on said dial the heading of the airplane, a pointer adjacent said compass needle and rotatable on an axis parallel with the axis of said compass needle, means effective to rotate said pointer at different selected constant speeds, and an adjustable marker on said dial to indicate a starting point for said pointer, whereby said pointer may be operated at different selected speeds in accordance with the predetermined time desired for said pointer to make a complete rotation from said starting marker, and whereby if said airplane is maneuvered so that said compass needle and said pointer are started from said marker in correspondence and are maintained in correspondence as said needle and pointer make one rotation, said airplane will move in a prescribed circle which will be completed in the same predetermined time.

5. In an airplane steering aid, a compass needle and dial on said airplane, said dial being fixed with respect to said airplane, operating means for said needle to effectively maintain it pointing in a given direction in spite of changes in the airplane heading to thereby indicate on said dial the actual heading of the airplane, a pointer adjacent said compass needle and rotatable on an axis parallel with the axis of said compass needle, driving means effective to rotate said pointer at different selected constant speeds, and adjustable marker on said dial to indicate a starting point for said pointer, manually operable means acting on said driving means for selecting the required speed for said pointer to cause it to make one complete revolution in a desired predetermined time, and an indicator means operated by said manually operable means for indicating in degrees per second the particular speed then selected for said pointer, whereby said pointer may be operated at different selected speeds in accordance with the predetermined time desired for said pointer to make complete rotation beginning at said starting marker and at the same time indicate the rate of turn which the airplane must make so that said compass needle and said pointer are operated in coincidence through a complete cycle starting from said marker within said predetermined time resulting in the airplane completing a circle within that time.

OSCAR S. FIELD.
SEDGWICK N. WIGHT.
RALPH W. HEWES.

REFERENCES CITED

The following references are of record in the file of this patent:

UNITED STATES PATENTS

| Number | Name | Date |
|---|---|---|
| 2,134,132 | Koster | Oct. 25, 1938 |
| 2,361,790 | Noxon | Oct. 31, 1944 |
| 2,492,531 | Lee | Dec. 27, 1949 |